(12) United States Patent
Hsieh et al.

(10) Patent No.: US 8,490,932 B2
(45) Date of Patent: Jul. 23, 2013

(54) DISK DRIVE ASSEMBLY

(75) Inventors: Kun-Chi Hsieh, Taipei Hsien (TW); Li Tong, Shenzhen (CN); Cheng-Yu Jiang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 208 days.

(21) Appl. No.: 12/965,247

(22) Filed: Dec. 10, 2010

(65) Prior Publication Data

US 2012/0006958 A1   Jan. 12, 2012

(30) Foreign Application Priority Data

Jul. 9, 2010 (CN) .......................... 2010 1 0222331

(51) Int. Cl.
*H05K 5/00* (2006.01)

(52) U.S. Cl.
USPC ................ 248/220.21; 248/918; 361/679.02; 312/223.1

(58) Field of Classification Search
USPC .................. 248/220.21, 221.11, 222.11, 918, 248/27.3; 361/679.02, 679.31, 679.32, 679.33, 361/679.37, 679.4, 679.41; 312/223.1, 223.2
See application file for complete search history.

(56) References Cited

U.S. PATENT DOCUMENTS

| | | | | |
|---|---|---|---|---|
| 6,392,879 B1 * | 5/2002 | Chien | ...................... | 361/679.33 |
| 6,944,016 B2 * | 9/2005 | Chen et al. | ............... | 361/679.33 |
| 7,787,244 B1 * | 8/2010 | Liu | ........................ | 361/679.33 |
| 7,823,934 B2 * | 11/2010 | Huang et al. | .................. | 292/143 |
| 7,839,118 B2 * | 11/2010 | Carnevali | ....................... | 320/107 |
| 8,118,270 B2 * | 2/2012 | Hsieh et al. | .............. | 248/220.21 |
| 2006/0291159 A1 * | 12/2006 | Jiang et al. | ..................... | 361/685 |

* cited by examiner

*Primary Examiner* — Steven Marsh
(74) *Attorney, Agent, or Firm* — Altis Law Group, Inc.

(57) ABSTRACT

A mounting apparatus for a disk drive includes a mounting bracket, a securing element, and an elastic element. The mounting bracket is configured to receive a disk drive. The securing element is slidably mounted to the mounting bracket. The securing element is configured to move between a first position and a second position. Wherein the securing element engages the disk drive in the first position to prevent the disk drive from moving along a first direction. The securing element is disengaged the disk drive in the second position. The elastic element biases the mounting bracket away from the securing element to prevent the securing element from disengaging the disk drive when the securing element is in the first position.

18 Claims, 6 Drawing Sheets

DISK DRIVE ASSEMBLY

BACKGROUND

1. Technical Field

The present disclosure relates to a disk drive assembly.

2. Description of Related Art

Often, at least one disk drive is secured in a housing of a computer for data storage, conventionally secured therein by a plurality of screws. The screws are small, however, and during installation or removal are easily dropped into the computer enclosure, which may result in damage.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
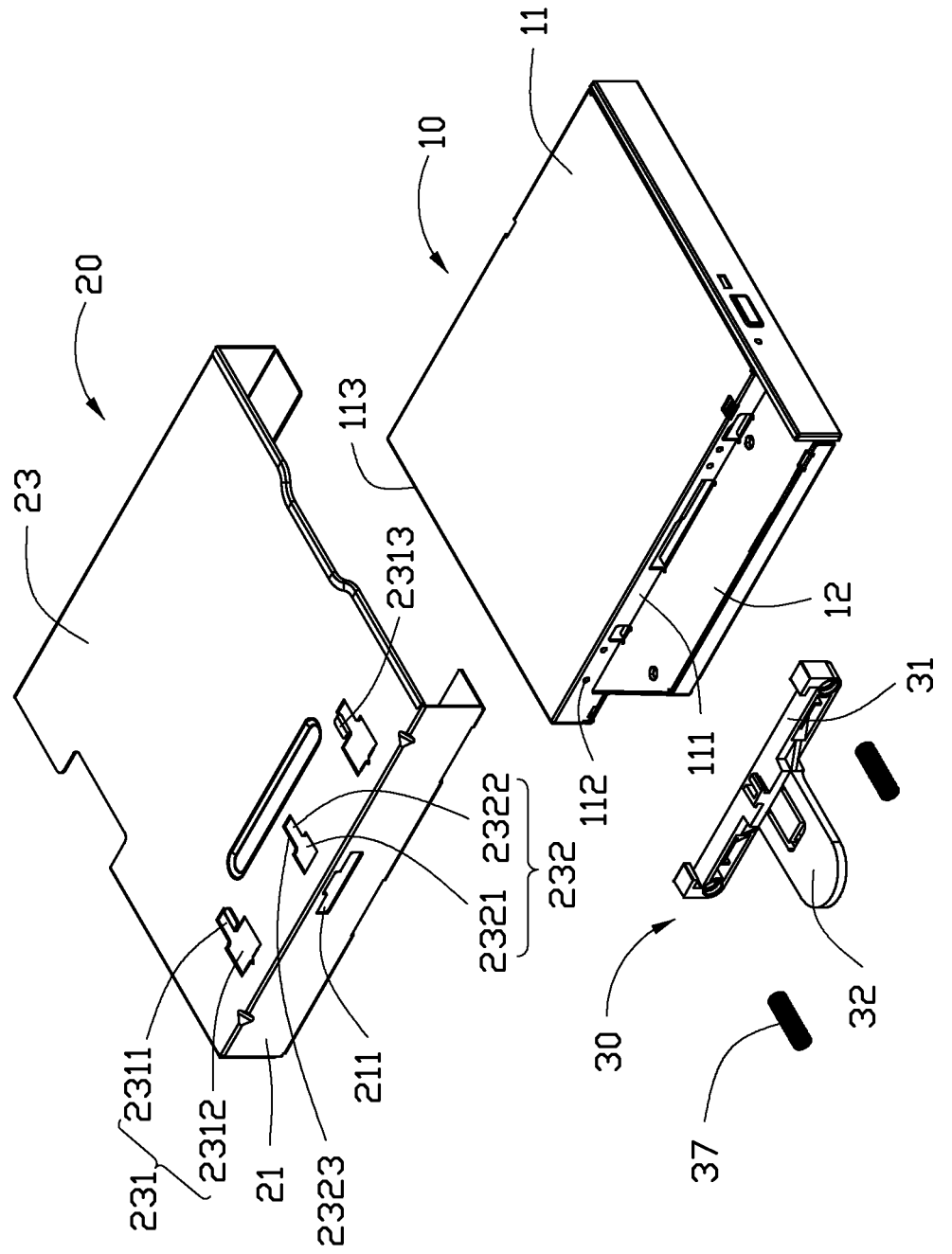
FIG. 1 is an exploded, isometric view of an embodiment of a disk drive assembly, including a securing element, a mounting bracket, and two elastic elements.
Figure 2:
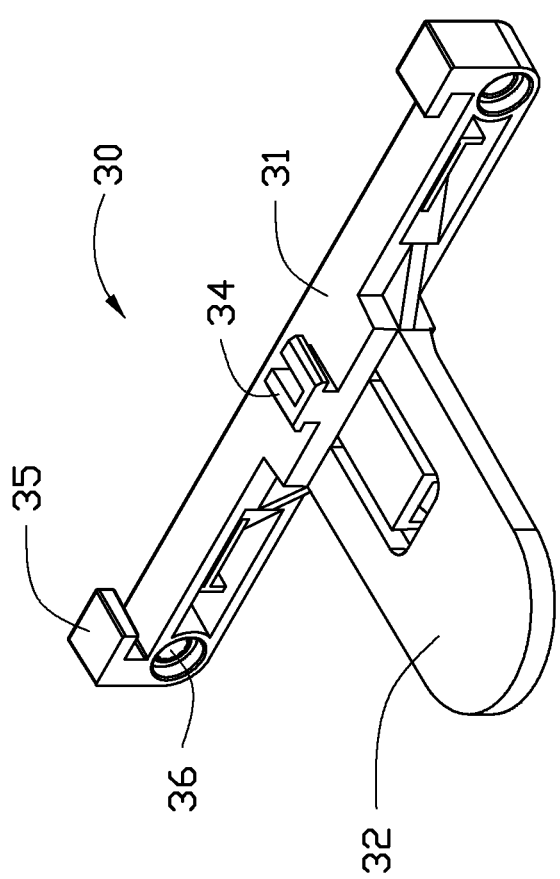
FIG. 2 is an isometric view of the securing element of FIG. 1.
Figure 3:
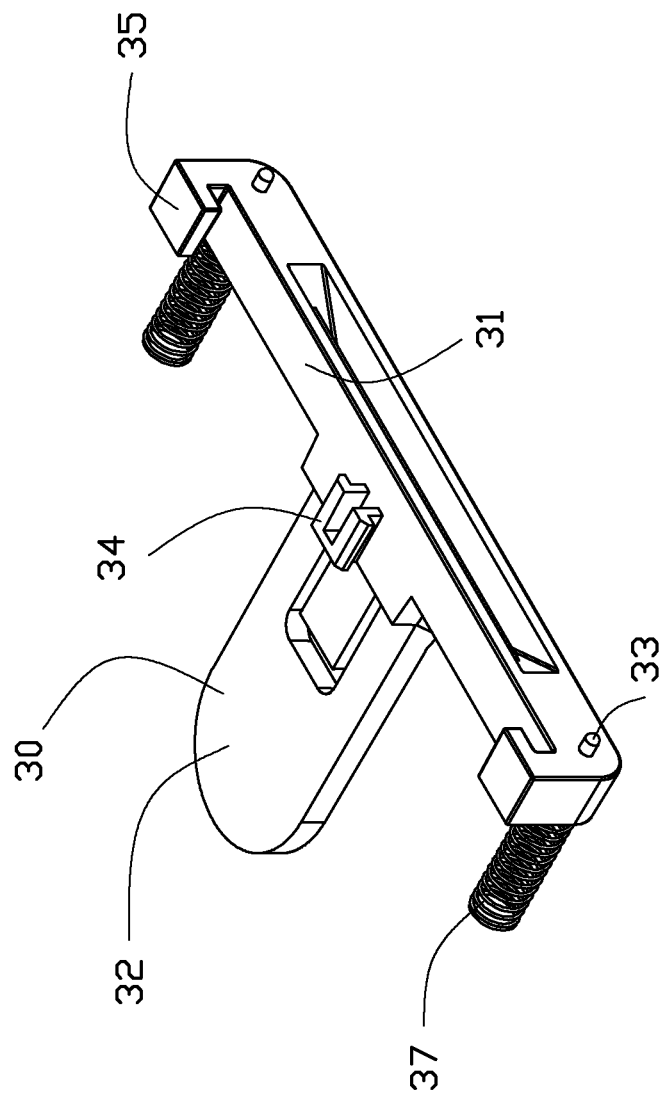
FIG. 3 is an assembled view of the securing element and the elastic elements of FIG. 1.
Figure 4:
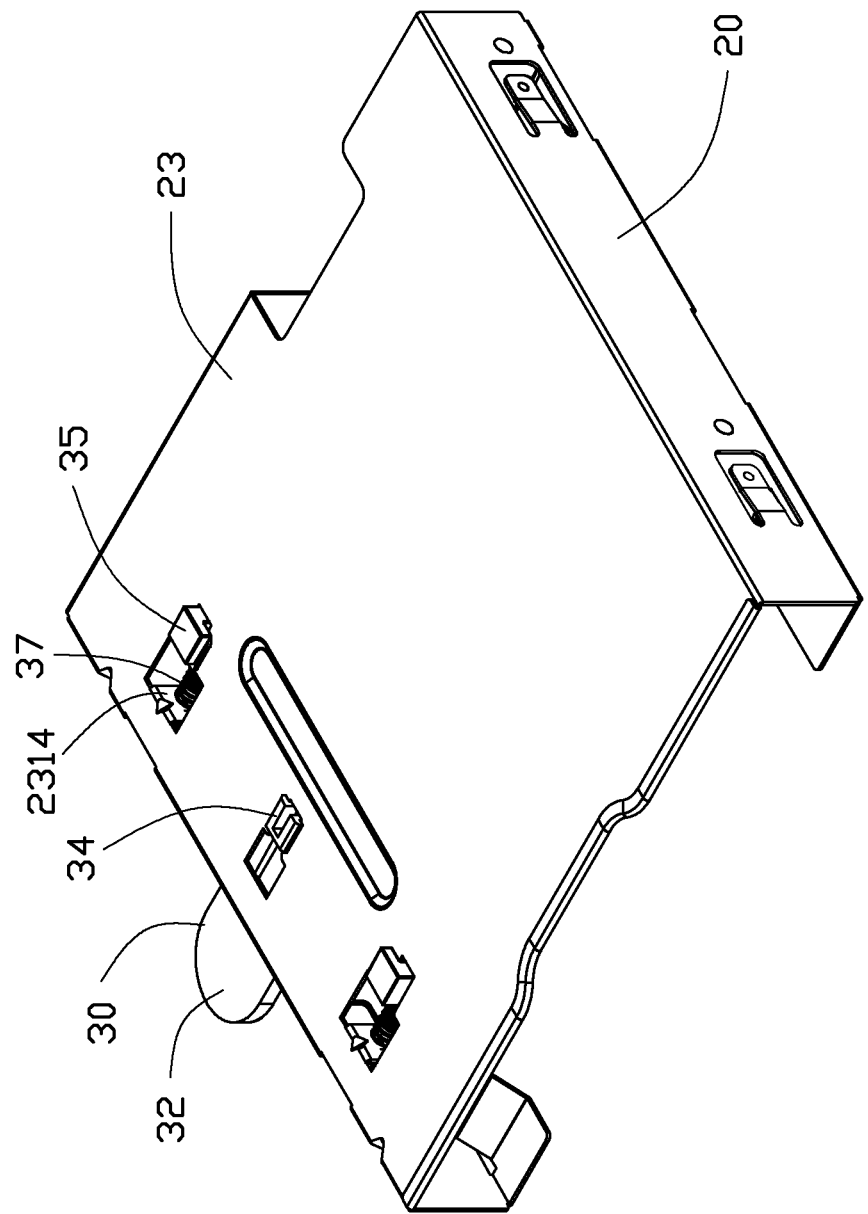
FIG. 4 is an assembled view of the mounting bracket, the securing element, and the elastic elements of FIG. 1.

Referring to FIGS. 1 through 4, a disk drive assembly includes a disk drive 10, a mounting bracket 20, and a securing element 30.

The disk drive 10 includes a disk drive body 11 and an extending portion 12 extending from the disk drive body 11. The extending portion 12 is thinner than the disk drive body 11. The disk drive body 11 defines a side surface 111 connected to the extending portion 12. Two securing holes 112 are defined in the side surface 111. The disk drive body 11 defines a rear side 113.

The mounting bracket 20 includes two parallel side panels 21, a top panel 23 connected between the two side panels 21, and a rear panel 24 extending perpendicularly from the top panel 23. The rear panel 24 is perpendicular to the side panels 21. The side panels 21 are parallel to the side surface 111. A supporting portion 22 extends from each side panel 21 towards the other side panel 21. An opening 211 is defined in one of the side panels 21. Each supporting portion 22 includes two protrusions 221. A first mounting opening 232 is defined in the top panel 23. The first mounting opening 232 includes a first wide part 2321 and a first narrow part 2322 connected to the first wide part 2321. The first narrow part 2322 defines opposite side edges 2323. Two second mounting openings 231 are defined in the top panel 23 and disposed in opposite sides of the first mounting opening 232. Each second mounting opening 231 includes a second narrow part 2311 and a second wide part 2312 connected to the second narrow part 2311. The second narrow part 2311 defines an edge 2313 adjacent to the first mounting opening 232. A resisting tab 2314 extends inwardly from an edge of the second wide part 2312 of each second mounting opening 231. A resisting portion 233 extends inwardly from the top panel 23 adjacent to the second narrow parts 2311 of the second mounting opening 231.

The securing element 30 includes a base 31 and a handle 32 extending from the base 31. The securing element 30 includes a T-shaped first sliding portion 34 extending from a middle portion of the base 31. The T-shaped first sliding portion 34 is configured to be slidably mounted in the first mounting opening 232. The securing element 30 includes two L-shaped second sliding portions 35 disposed on opposite sides of the first sliding portion 34. The L-shaped second sliding portions 35 are configured to be slidably mounted in the second mounting opening 231. The securing element 30 includes two columnar protrusions 33 extending from the base 31. Two receiving portions 36 are defined in the base 31 adjacent to the handle 32. Each receiving portion 36 is configured to receive an elastic element 37. In one embodiment, the elastic element 37 is a spring.

Figure 5:
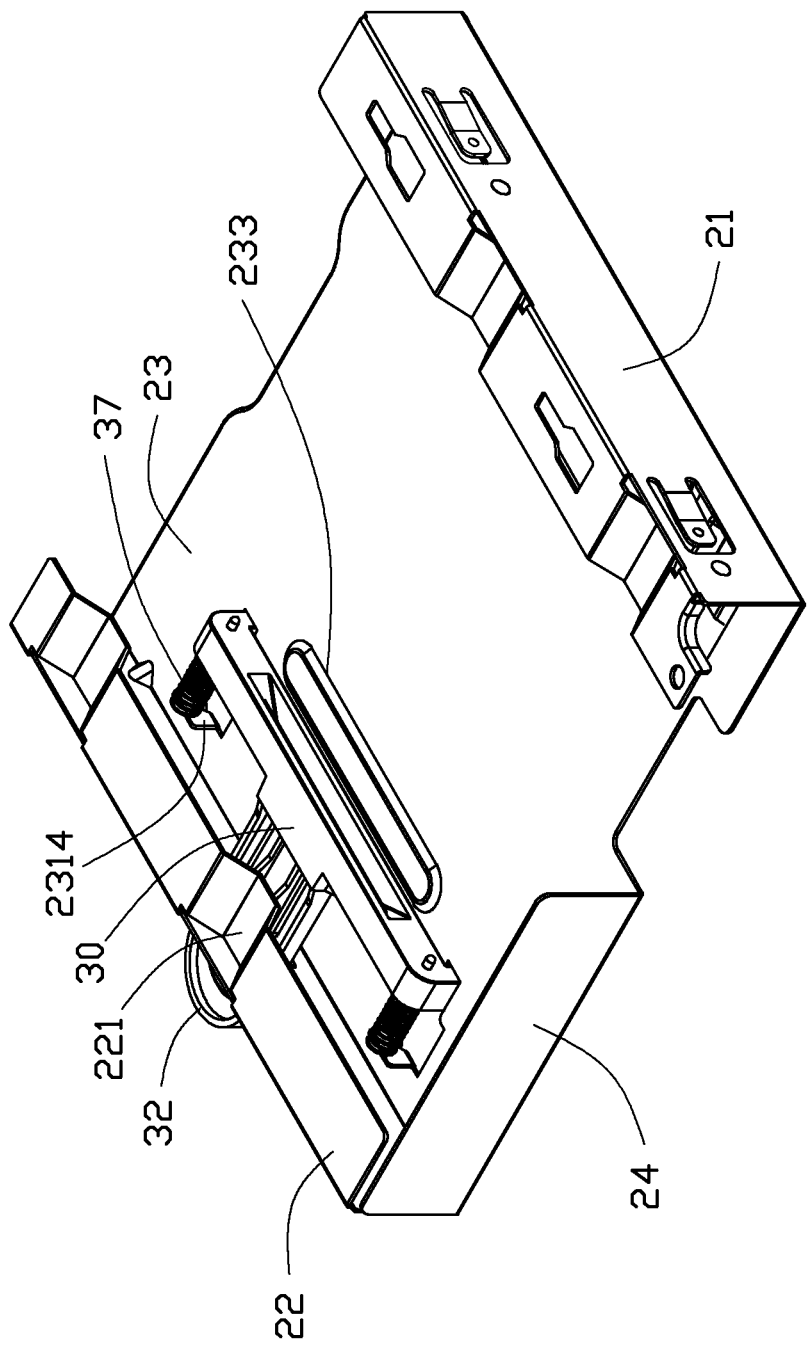
FIG. 5 is similar to FIG. 4, but viewed from another aspect.
Figure 6:
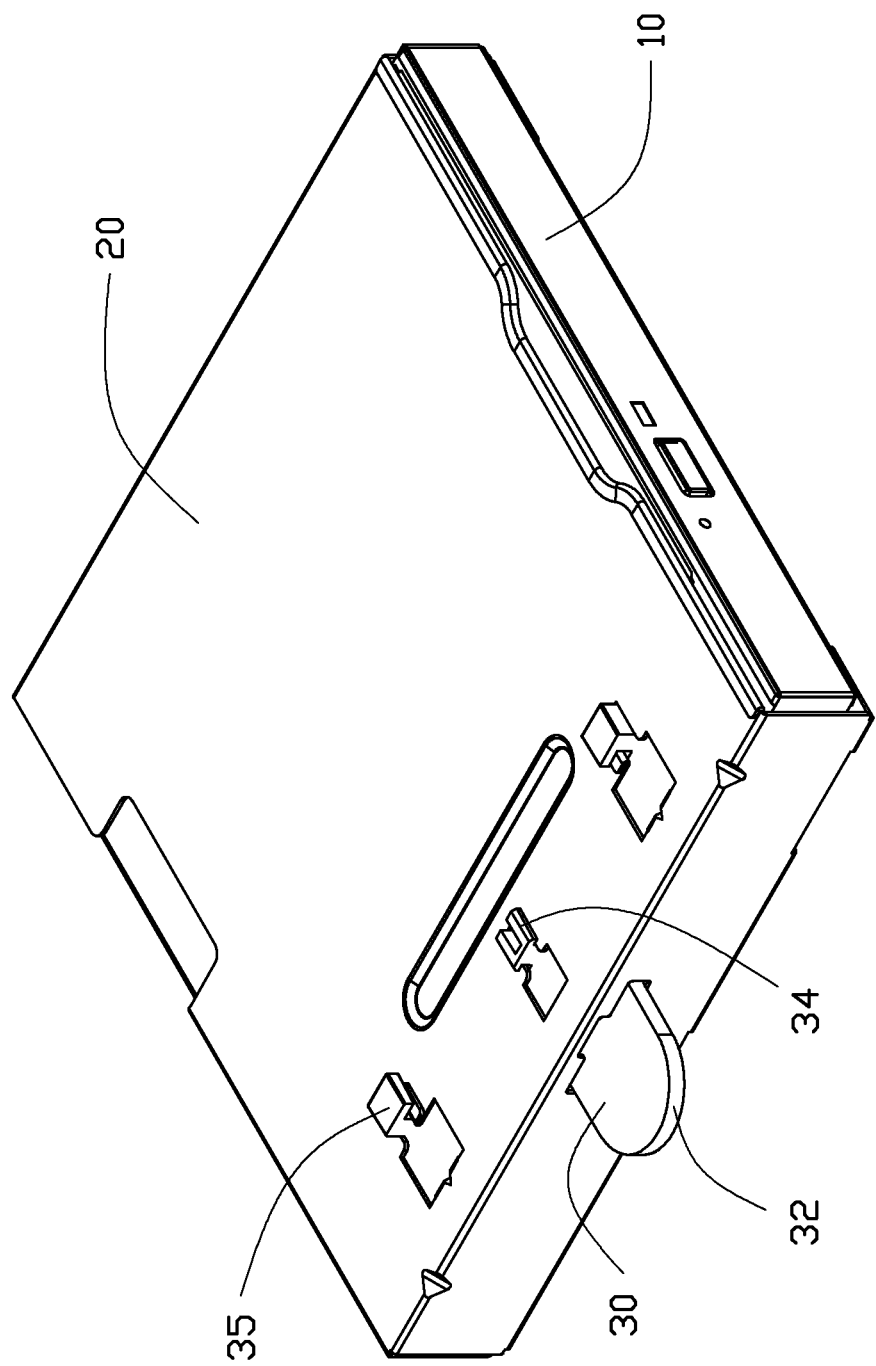
FIG. 6 is an assembled view of FIG. 1.

Referring to FIGS. 1 to 6, in assembly, two elastic elements 37 are received in the receiving portion 36. The handle 32 of the securing element 30 extends through the opening 211 of the mounting bracket 20. The handle 32 is pulled outward to enable the base 31 to close the opening 211. The first sliding portion 34 and the second sliding portions 35 extend through the first wide part 2321, of the first mounting opening 232, and the second wide part 2312, of the second mounting opening 231. At this time, the two elastic elements 37 are compressed. The elastic elements 37 release to enable the base 31 to move away from the opening 211 when the handle 32 is in a free status. At this time, the first sliding portion 34 slides to the first narrow part 2322 of the first mounting opening 232, and the second sliding portions 35 slide to the second narrow parts 2311 of the second mounting opening 231. The first sliding portion 34 is disposed on the opposite side edges 2323 of the first narrow part 2322. The second sliding portions 35 are disposed on the edges 2313 of the second narrow parts 2311. At this time, the base 31 of the securing element 30 resists against the resisting portion 233. The disk drive 10 is placed on the supporting portions 22 of the mounting bracket 20, after the handle 32 of the securing element 30 is pulled outward, to enable the base 31 close to the opening 211. The disk drive 10 is pushed inward until the rear portion 113 of the disk drive 10 contacts the rear panel 24. At this time, the disk drive 10 is disposed on the two protrusions 221 of the mounting bracket 20, and the securing holes 112, of the disk drive 10, are aligned with the protrusions 33 of the securing element 30. The securing element 30 is moved towards the disk drive 10 in a direction perpendicular to the side panel 21. The protrusions 33 of the securing element 30 are received in the corresponding securing holes 112, thereby securing the disk drive 10 in the mounting bracket 20. At this time, the securing element 30 is in a first position, and the base 31 of the securing element 30 is disposed on the extending portion 12 of the disk drive 10.

During removal, the handle 32 of the securing element 30 is withdrawn from the disk drive 10 to enable the protrusions 33 to disengage from the securing holes 112. The disk drive 10 moves outward to separate from the mounting bracket 20.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus, comprising:
a mounting bracket, and the mounting bracket configured to receive a disk drive;
a securing element, the securing element slidably mounted to the mounting bracket, the securing element configured to move between a first position and a second position along a first direction, wherein the securing element engages the disk drive in the first position to prevent the disk drive from moving along a second direction that is substantially perpendicular to the first direction; the securing element is disengaged the disk drive in the second position; and
an elastic element, the elastic element biasing the mounting bracket away from the securing element to prevent the securing element disengaging from the disk drive when the securing element is in the first position;
wherein the mounting bracket comprises a side panel that is substantially parallel to the second direction; an opening is defined in the side panel; the securing element comprises a handle extending through the opening; and the handle is configured to drive the securing element to slide between the first position and the second position.

2. The mounting apparatus of claim 1, wherein the securing element comprises a receiving portion receiving the elastic element.

3. The mounting apparatus of claim 2, wherein the mounting bracket comprises a resisting tab, and the elastic element resiliently resists between the resisting tab and the receiving portion.

4. The mounting apparatus of claim 3, wherein the securing element comprises a base, the receiving portion is defined in the base; the mounting bracket comprises a resisting portion, the resisting portion configured to prevent the securing element from moving; and the base is disposed between the elastic element and the resisting portion.

5. The mounting apparatus of claim 1, wherein a top panel that is substantially perpendicular to the side panel, and the securing element extends through the side panel and is slidably mounted to the top panel.

6. The mounting apparatus of claim 5, wherein a first mounting opening is defined in the top panel, and the securing element comprises a first sliding portion mounted in the first mounting opening.

7. The mounting apparatus of claim 6, wherein the first mounting opening comprises a wide part and a narrow part that is connected to the wide part, and the first sliding portion extends through the wide part to slide to the narrow part.

8. The mounting apparatus of claim 5, wherein the mounting bracket further comprises a supporting portion extending from the side panel, the supporting portion configured to support the disk drive.

9. The mounting apparatus of claim 1, wherein the securing element comprises a base and a protrusion extending from the base; the handle and the protrusion are disposed on opposite sides of the base; and the protrusion engages a securing hole of the disk drive when the securing element is in the first position.

10. A mounting apparatus for a disk drive, comprising:
a mounting bracket, the mounting bracket comprising a side panel;
a securing element, the securing element slidably mounted to the mounting bracket, the securing element engages the disk drive to prevent the disk drive from moving along a first direction substantially parallel to the side panel, the securing element is configured to move along a second direction substantially perpendicular to the side panel, to disengage the disk drive; and
an elastic element, the elastic element biasing the mounting bracket away from the securing element to enable the securing element to contact the disk drive tightly;
wherein the securing element comprises a base, a handle extending from the base, and a protrusion extending from the base; the handle and the protrusion are disposed on opposite sides of the base; the handle is configured to be operated to enable the securing element to slide relative to the mounting bracket; and the protrusion engages a securing hole of the disk drive.

11. The mounting apparatus of claim 10, wherein the securing element comprises a receiving portion receiving the elastic element.

12. The mounting apparatus of claim 11, wherein the mounting bracket comprises a resisting tab, and the elastic element resiliently resists between the resisting tab and the receiving portion.

13. The mounting apparatus of claim 12, wherein the receiving portion is defined in the base; the mounting bracket comprises a resisting portion; and the base is disposed between the elastic element and the resisting portion.

14. The mounting apparatus of claim 10, wherein the mounting bracket further comprises a top panel substantially perpendicular to the side panel, the securing element extends through the side panel to be slidably mounted to the top panel.

15. The mounting apparatus of claim 14, wherein a first mounting opening is defined in the top panel, and the securing element comprises a first sliding portion mounted in the first mounting opening.

16. The mounting apparatus of claim 15, wherein the first mounting opening comprises a wide part and a narrow part connected to the wide part, the first sliding portion is configured to extend through the wide part to slide to the narrow part.

17. The mounting apparatus of claim 14, wherein the mounting bracket further comprises a supporting portion extending from the side panel, the supporting portion configured to support the disk drive.

18. The mounting apparatus of claim 14, wherein an opening is defined in the side panel; the handle extending through the opening; and the handle is configured to be driven to enable the securing element to slide relative to the mounting bracket.

* * * * *